United States Patent

Wachi et al.

[11] Patent Number: 6,058,346
[45] Date of Patent: May 2, 2000

[54] DECELERATION CONTROLLING APPARATUS CAPABLE OF CONTROLLING DECELERATION DURING A THROTTLE VALVE FAILURE

[75] Inventors: Satoshi Wachi; Shiro Yonezawa, both of Tokyo; Tatsuhiko Takahashi, Hyogo, all of Japan

[73] Assignee: Mitsubishi Denki Kabushiki Kaisha, Tokyo, Japan

[21] Appl. No.: 09/065,235

[22] Filed: Apr. 23, 1998

[30] Foreign Application Priority Data

Dec. 1, 1997 [JP] Japan ..................... 9-330546

[51] Int. Cl.[7] .............. G06F 7/00; G06F 17/00; F16H 61/26
[52] U.S. Cl. .............. 701/55; 477/906; 477/127
[58] Field of Search ............ 701/55, 56; 477/906, 477/107, 184, 115, 121, 127, 138

[56] References Cited

U.S. PATENT DOCUMENTS 5,366,424  11/1994  Wataya ..................... 477/107

FOREIGN PATENT DOCUMENTS 1-229145  9/1989  Japan ............... F16H 5/40
5-301535  11/1993  Japan .
6-264800  9/1994  Japan .

*Primary Examiner*—Douglas C. Butler
*Assistant Examiner*—Jeffrey Woller
*Attorney, Agent, or Firm*—Sughrue, Mion, Zinn, Macpeak & Seas, PLLC

[57] ABSTRACT

To provide a deceleration controlling apparatus for an automotive vehicle, which may perform a deceleration control that is effective in a breakdown of a throttle valve kept opened, without increasing a cost, the deceleration controlling apparatus for an automotive vehicle, includes: an engine, an accelerator pedal and a brake system which are mounted on the vehicle; an automatic transmission connected to the engine; a throttle valve for adjusting an amount of intake air of the engine; an accelerator opening degree sensor for detecting an opening degree of the accelerator pedal to output an accelerator opening degree signal; a throttle valve controlling unit for electrically controlling an opening degree of the throttle valve in response to the accelerator opening degree signal; a throttle opening degree sensor for detecting an opening degree of the throttle valve to output a throttle opening degree signal; a throttle-open breakdown detecting unit S3 for detecting a breakdown of throttle-open of the throttle valve; a deceleration condition detecting unit S5 for detecting a deceleration condition of the vehicle; and a speed-change pattern changing unit S7 for changing a speed-change pattern of the automatic transmission on a low gear side when the breakdown of throttle-open and the deceleration condition are detected.

14 Claims, 7 Drawing Sheets

DECELERATION CONTROLLING APPARATUS CAPABLE OF CONTROLLING DECELERATION DURING A THROTTLE VALVE FAILURE

BACKGROUND OF THE INVENTION

1. Field of the Invention

The present invention relates to a deceleration controlling apparatus for an automotive vehicle, which may perform a deceleration control that is effective when a throttle valve is out of order such as being kept opened, without increasing a cost.

2. Description of the Related Art

FIG. 6 is a view showing a structure of a conventional deceleration controlling apparatus for an automotive vehicle, disclosed in, for example, Japanese Patent Application Laid Open Nos. Hei 5-301535 and Hei 6-264800.

In FIG. 6, an engine 1 mounted on the vehicle is composed of a plurality of cylinders and provided with an intake pipe 2 and an exhaust pipe (not shown).

An air flow sensor (hereinafter referred to as "AFS") 3 is provided on an upstream side of the intake valve 2 for detecting an amount of intake air to be fed to the engine 1 and outputting an intake air amount signal Q.

A throttle valve 4 is provided to be openable/closable within the intake pipe 2, thereby adjusting the intake air amount Q.

A throttle actuator 5 is composed of a motor provided on a rotary shaft of the throttle valve 4 for drivingly opening/closing the throttle valve 4.

A throttle opening degree sensor (TPS) 6 detects an opening degree of the throttle valve 4 to output a throttle opening degree signal T.

A bypass passage 7 is provided in a part of the intake pipe 2 to bypass between the upstream side and the downstream side of the throttle valve 4.

A bypass controlling valve 8 adjusts an opening degree of the bypass passage 7 for controlling an amount of bypass air.

An injector 9 injects a fuel into the interior of the intake pipe 2 on the intake side of the engine 1. Ignition plugs 10 are provided for the respective cylinders of the engine 1 for generating discharge sparks by the application of the ignition high voltage and burning the mixture within the respective cylinders.

An automatic transmission 11 is connected to the engine 1 to automatically adjust a gear speed ratio. A hydraulic solenoid 12 drives the automatic transmission 11 to switch and control the speed ratios.

An accelerator pedal 13 is operated by a driver, and an accelerator opening degree sensor (APS) 14 detects an opening degree of the accelerator pedal 13 to output an accelerator opening degree signal A.

A brake system 15 is composed of a brake pedal 16, a brake switch 17, a booster 18 and a brake working portion 19.

The brake pedal 16 is operated by the driver, and a brake switch 17 detects a step-in amount of the brake pedal 16 to output a brake signal B.

Also, the booster 18 amplifies and transmits the step-in force of the brake pedal 16, and the brake working portion 19 is driven by the output of the booster 18. The booster 18 realizes a booster function by using a vacuum pressure within the intake pipe 2.

A controlling section 20 is composed of a microcomputer for outputting drive signals for the various actuators on the basis of information signals from the various sensors for detecting the operational condition of the engine 1.

Also, the controlling section 20 constitutes a throttle valve controlling means in cooperation with the throttle actuator 5 for electrically controlling the opening degree of the throttle valve 4 in response to the accelerator opening signal A.

The drive signals outputted from the controlling sections 20 are a motor drive signal M for the throttle actuator 5, a bypass drive signal D for the bypass controlling valve 8, an injection signal J for the injector 9, an ignition signal P for the spark plug 10, a speed-change signal C for the hydraulic solenoid 12 and the like.

Also, a variety of sensors for detecting the operational condition are an RPM sensor 21, a load sensor 22, a vehicle velocity sensor 23 and the like as well as the AFS 3, the TPS 6 and the APS 14.

The RPM sensor 21 is provided on, for example, a crankshaft of the engine 1 for detecting the engine RPM and outputting an RPM signal Ne.

The load sensor 22 detects the load of the engine 1 and outputs a load signal L. The vehicle velocity sensor 23 detects a velocity of the vehicle to output a vehicle velocity signal V.

Also, an apparatus in which a hydraulic pressure (brake force) working on the brake working portion 19 is controllable as desired to thereby further enhance the drivability in deceleration has heretofore been proposed.

FIG. 7 is a view showing a structure of a conventional vehicle deceleration controlling apparatus that may control the brake force.

In FIG. 7, the same reference numerals are used to indicate the like components or members as in FIG. 6, and therefor the detailed description thereof is omitted.

In this case, the brake system 15 is provided with a pump 24 and a reservoir 25 which constitute a hydraulic pressure adjusting means for adjusting the hydraulic pressure to thereby drive the brake working portion 19.

The pump 24 is in communication with the booster 18 and the brake working portion 19 for feeding and collecting oil for the reservoir 25.

Also, the controlling section 20A includes a hydraulic controlling means for controlling the pump 24 of the hydraulic pressure adjusting means to output a pump drive signal R for the pump 24.

As shown in FIGS. 6 and 7, the conventional vehicle deceleration controlling apparatus utilizes the vacuum pressure within the intake pipe 2 of the engine 1 for the booster 18 within the brake system 15.

Also, in consideration of the case where the vacuum pressure within the intake pipe 2 is insufficient, a vacuum pump (not shown) or the like is provided as desired.

Also, in the conventional apparatus disclosed in the above-described Japanese Patent Application Laid-Open No. Hei 5-301535, in the case where the throttle valve 4 is broken down while being kept fully closed, the speed ratio pattern of the automatic transmission 11 is changed on the low gear ratio side.

Also, in the conventional apparatus disclosed in the above-described Japanese Patent Application Laid-Open No. Hei 6-264800, in the case where the throttle valve 4 is broken down while being kept opened, the speed ratio pattern of the automatic transmission 11 is fixed to a third speed.

However, in the above-described conventional apparatus, in the case where the throttle valve 4 could not be closed below a certain opening degree due to a breakdown such as being kept open, the cylinder stop control (interrupt of the fuel injection) of the engine 1 or a retard control of the ignition timing is effected to suppress the generated torque of the engine 1 to mainly prevent an abrupt start or an abrupt acceleration.

In such conventional apparatus, in the case where the throttle valve 4 is broken down while being kept opened, no vacuum pressure is generated in the intake system of the engine 1 so that it is impossible to provide the vacuum pressure to the booster 18 within the brake system 15.

As a result, since the function of the booster 18 is degraded, the step-in force that is necessary when the brake-pedal 16 is stepped in is increased, resulting in degradation of the work of the brake system 15.

Also, in the case where the throttle valve 4 is broken down while being kept opened, the automatic transmission 11 is fixed to a predetermined higher speed-change stage, i.e., a predetermined lower gear speed-change ratio (for example, corresponding to a third speed) to thereby suppress the drive force to prevent an abrupt start or an abrupt acceleration.

Accordingly, in deceleration, due to the degradation of the work of the brake system 15, it is impossible to obtain a sufficient brake force. It is therefore difficult to decelerate the vehicle.

Also, in the breakdown in the open throttle condition, the gear ratio is fixed to a lower gear reduction ratio (a higher speed) so that a relatively high vehicle velocity would be attained even in a low engine RPM. For this reason, in braking the vehicle, an idle running feeling occurs, and it is difficult to stop the vehicle.

As described above, the conventional vehicle deceleration controlling apparatus suffers from a problem that, since the brake system 15 is functioned by using the vacuum pressure in the intake system, in the case where the throttle valve 4 is broken down while being kept opened, the vacuum pressure in the intake system is insufficient so that the booster 18 functions at a low level, resulting in degradation of the work of the brake system 15.

Also, in the case where the throttle valve 4 is broken down while being kept opened, since the automatic transmission 11 is fixed to a predetermined relatively high speed (for example, corresponding to a third speed), that is, a predetermined lower gear reduction ratio, to thereby suppress the drive torque, the function of the brake system 15 becomes worse in deceleration, resulting in the difficulty to obtain a sufficient brake force. Thus, the conventional apparatus suffers from a problem that it is difficult in obtaining decelerate the vehicle.

Furthermore, in the case where the throttle valve 4 is broken down while being kept opened, since the gear reduction ratio is fixed to a lower level (i.e., a relatively high speed corresponding to a third speed), a relatively high vehicle velocity is attained even at a low engine RPM of the engine 1. Accordingly, in braking the vehicle, an idle running feeling occurs, and it is difficult to stop the vehicle.

SUMMARY OF THE INVENTION

In view of the foregoing shortcomings, an object of the present invention is to provide a deceleration controlling apparatus for an automotive vehicle, which may perform a deceleration control that is effective in a breakdown of a throttle valve kept opened, without increasing a cost.

According to the present invention, there is provided a deceleration controlling apparatus for an automotive vehicle, comprising: an engine, an accelerator pedal and a brake system which are mounted on the vehicle; an automatic transmission connected to the engine; a throttle valve for adjusting an amount of intake air of the engine; an accelerator opening degree sensor for detecting an opening degree of the accelerator pedal to output an accelerator opening degree signal; a throttle valve controlling means for electrically controlling an opening degree of the throttle valve in response to the accelerator opening degree signal; a throttle opening degree sensor for detecting an opening degree of the throttle valve to output a throttle opening degree signal; a throttle-open breakdown detecting means for detecting a breakdown of throttle-open of the throttle valve; a deceleration condition detecting means for detecting a deceleration condition of the vehicle; and a speed-change pattern changing means for changing a speed-change pattern of the automatic transmission on a low gear side when the breakdown of throttle-open and the deceleration condition are detected.

In the deceleration controlling apparatus for an automotive vehicle according to the invention, the throttle-open breakdown detecting means detects the breakdown of throttle-open on the basis of a relationship between the throttle opening degree signal and the accelerator opening degree signal.

In the deceleration controlling apparatus for an automotive vehicle according to the invention, the deceleration condition detecting means detects the deceleration condition when a brake pedal of the brake system is stepped in.

In the deceleration controlling apparatus for an automotive vehicle according to the invention, the speed-change pattern changing means sets a speed-change ratio of the automatic transmission to a level equal to or lower than a predetermined speed-change ratio.

In the deceleration controlling apparatus for an automotive vehicle according to the invention, the predetermined speed-change ratio corresponds to a second speed which is higher than a first speed on the lowest gear side.

Also, in the deceleration controlling apparatus for an automotive vehicle according to the invention, the speed-change pattern changing means sets the speed-change ratio of the automatic transmission to a level equal to or lower than a predetermined speed-change ratio in the case where the deceleration condition detecting means detects a predetermined deceleration condition corresponding to a state immediately before a stop of the vehicle.

Also, in the deceleration controlling apparatus for an automotive vehicle according to the invention, the predetermined deceleration condition is detected in the case where a velocity of the vehicle exhibits a level equal to or lower than a predetermined vehicle velocity.

Also, in the deceleration controlling apparatus for an automotive vehicle according to the invention, the predetermined deceleration condition is detected in the case where a brake pedal of the brake system is stepped in.

Also, in the deceleration controlling apparatus for an automotive vehicle according to the invention, the predetermined deceleration condition is detected in the case where the accelerator opening degree signal exhibits a level equal to or lower than a predetermined opening degree.

Also in the deceleration controlling apparatus for an automotive vehicle according to the invention, the speed-change pattern changing means sets a prohibition region where the speed is prohibited from shifting to a predetermined speed-change ratio within a region where the accelerator opening degree signal exhibits a level equal to or lower than a predetermined opening degree and the velocity of the vehicle exhibits a level equal to or lower than a predetermined velocity.

Also, the deceleration controlling apparatus for an automotive vehicle according to the invention, further comprises: a hydraulic pressure adjusting means for adjusting a hydraulic pressure for driving the brake system; and a hydraulic pressure controlling means for controlling the hydraulic pressure adjusting means, and the hydraulic pressure controlling means increases the hydraulic pressure in response to the step-in operation of the brake pedal in the case where the breakdown of throttle-open is detected.

Also, according to the present invention, there is provided a deceleration controlling apparatus for an automotive vehicle, comprising: an engine, an accelerator pedal and a brake system which are mounted on the vehicle; an automatic transmission connected to the engine; a throttle valve for adjusting an amount of intake air of the engine; an accelerator opening degree sensor for detecting an opening degree of the accelerator pedal to output an accelerator opening degree signal; a throttle valve controlling means for electrically controlling an opening degree of the throttle valve in response to the accelerator opening degree signal; a throttle opening degree sensor for detecting an opening degree of the throttle valve to output a throttle opening degree signal; a throttle-open breakdown detecting means for detecting a breakdown of throttle-open of the throttle valve; a deceleration condition detecting means for detecting a deceleration condition of the vehicle; and a speed-change pattern changing means for setting a speed-change ratio of the automatic transmission at a level equal to or lower than a predetermined speed-change ratio when the breakdown of throttle-open and the deceleration condition are detected.

Also, in the deceleration controlling apparatus for an automotive vehicle according to the invention, the speed-change pattern changing means sets the speed-change ratio of the automatic transmission to the level equal to or lower than the predetermined speed-change ratio in the case where the deceleration condition detecting means detects a predetermined deceleration condition corresponding to a state immediately before a stop of the vehicle, and the predetermined speed-change ratio corresponds to a second speed which is higher than a first speed on the lowest gear side.

Also, according to the invention, there is provided a deceleration controlling apparatus for an automotive vehicle, comprising: an engine, an accelerator pedal and a brake system which are mounted on the vehicle; a hydraulic pressure adjusting means for adjusting a hydraulic pressure for driving the brake system; a hydraulic pressure controlling means for controlling the hydraulic pressure adjusting means; a throttle valve for adjusting an amount of intake air of the engine; an accelerator opening degree sensor for detecting an opening degree of the accelerator pedal to output an accelerator opening degree signal; a throttle opening degree sensor for detecting an opening degree of the throttle valve to output a throttle opening degree signal; a throttle-open breakdown detecting means for detecting a breakdown of throttle-open of the throttle valve; and a deceleration condition detecting means for detecting a deceleration condition of the vehicle, wherein the hydraulic controlling means increases the hydraulic pressure in the case where the breakdown of throttle-open and the deceleration condition are detected.

DESCRIPTION OF THE PREFERRED EMBODIMENTS

Embodiment 1

Figure 1:
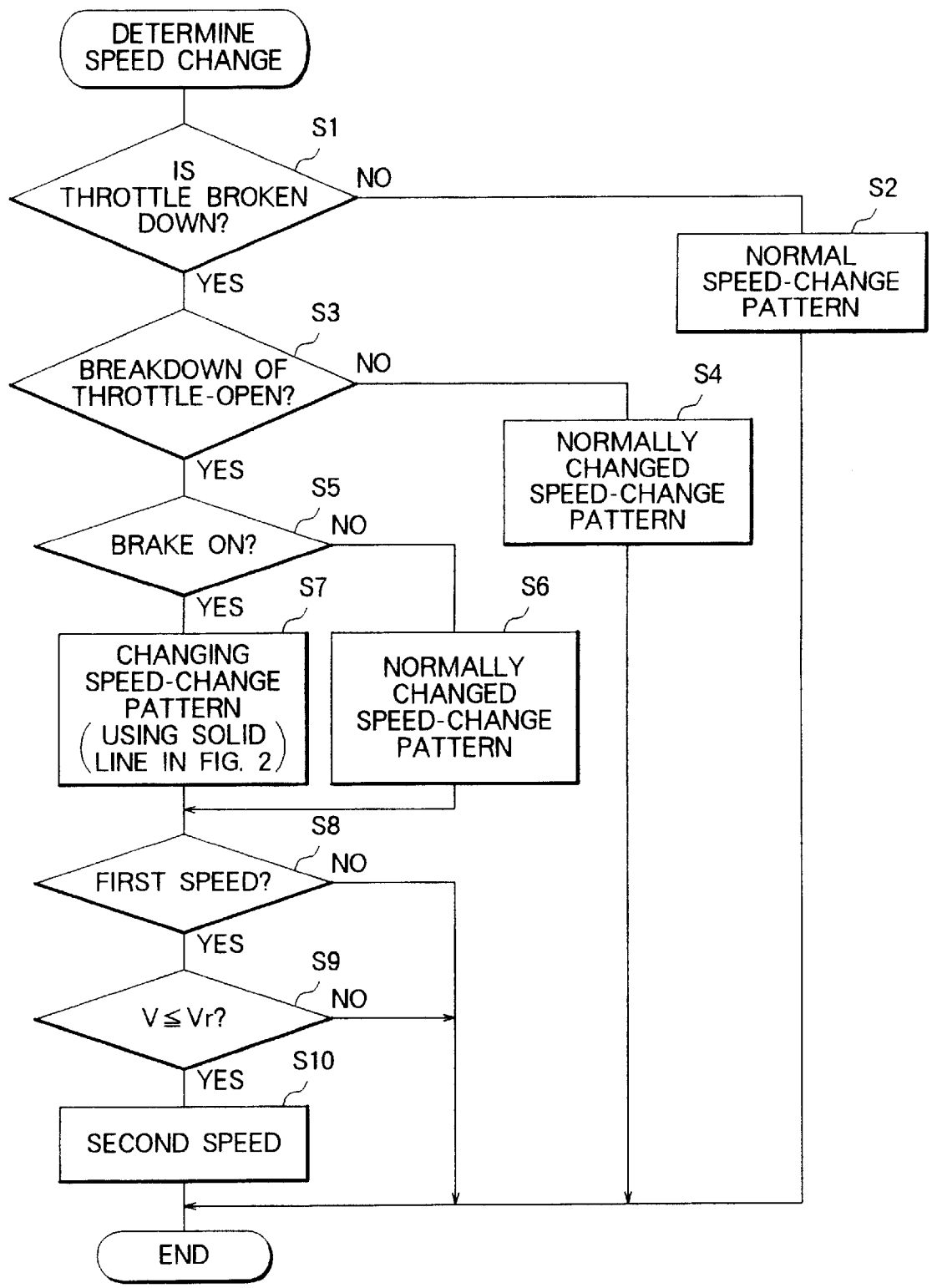
FIG. 1 is a flowchart showing a processing operation in accordance with a first embodiment of the present invention.

An embodiment of the invention will now be described with reference to the accompanying drawings. Incidentally, the structure of this embodiment is substantially the same as that shown in FIG. 6 and there is only a difference therebetween in parts of the operational program within the controlling section 20.

In this case, the controlling section 20 (see FIG. 6) is provided with a well known breakdown detecting means for detecting a breakdown in a fully closed condition of the throttle valve 4 or the like, a throttle-open breakdown detecting means for detecting a breakdown in an open condition of the throttle valve 4, a deceleration condition detecting means for detecting a deceleration condition of the vehicle, and a speed-change pattern changing means for changing a speed-change pattern of the automatic transmission 11 on the low gear side when the breakdown of throttle-open and the deceleration condition are detected.

The controlling section 20 detects the breakdown of throttle-open on the basis of, for example, the relationship between the throttle opening degree signal T and the accelerator opening degree signal A in the case where the throttle opening degree signal T exhibits a level equal to or more than a predetermined opening degree without depending upon the accelerator opening degree signal A (or in the case where the deviation between the throttle opening degree signal T and the accelerator opening degree signal A exhibits a level equal to or more than a predetermined opening degree) or the like. In this case, the controlling section 20 establishes a throttle-open breakdown flag.

Also, the deceleration condition detecting means within the controlling section 20 detects the deceleration condition in response to the brake signal B when the brake pedal 16 of the brake system 15 is stepped in. Furthermore, the speed-change pattern changing means within the controlling section 20 sets the speed ratio of the automatic transmission 11 to a predetermined speed-change ratio or less (second speed or more) in the case where a predetermined deceleration condition corresponding to a level immediately before the stop of the vehicle is detected.

In this case, the deceleration condition detecting means may be modified to detect the predetermined deceleration condition in the case where the vehicle velocity signal V exhibits a level equal to or less than a predetermined vehicle speed, in the case where the brake pedal 16 is stepped in (in the case where the brake signal B is generated), or in the case where the accelerator opening degree signal A exhibits a level equal to or less than a predetermined opening degree.

Figure 6:
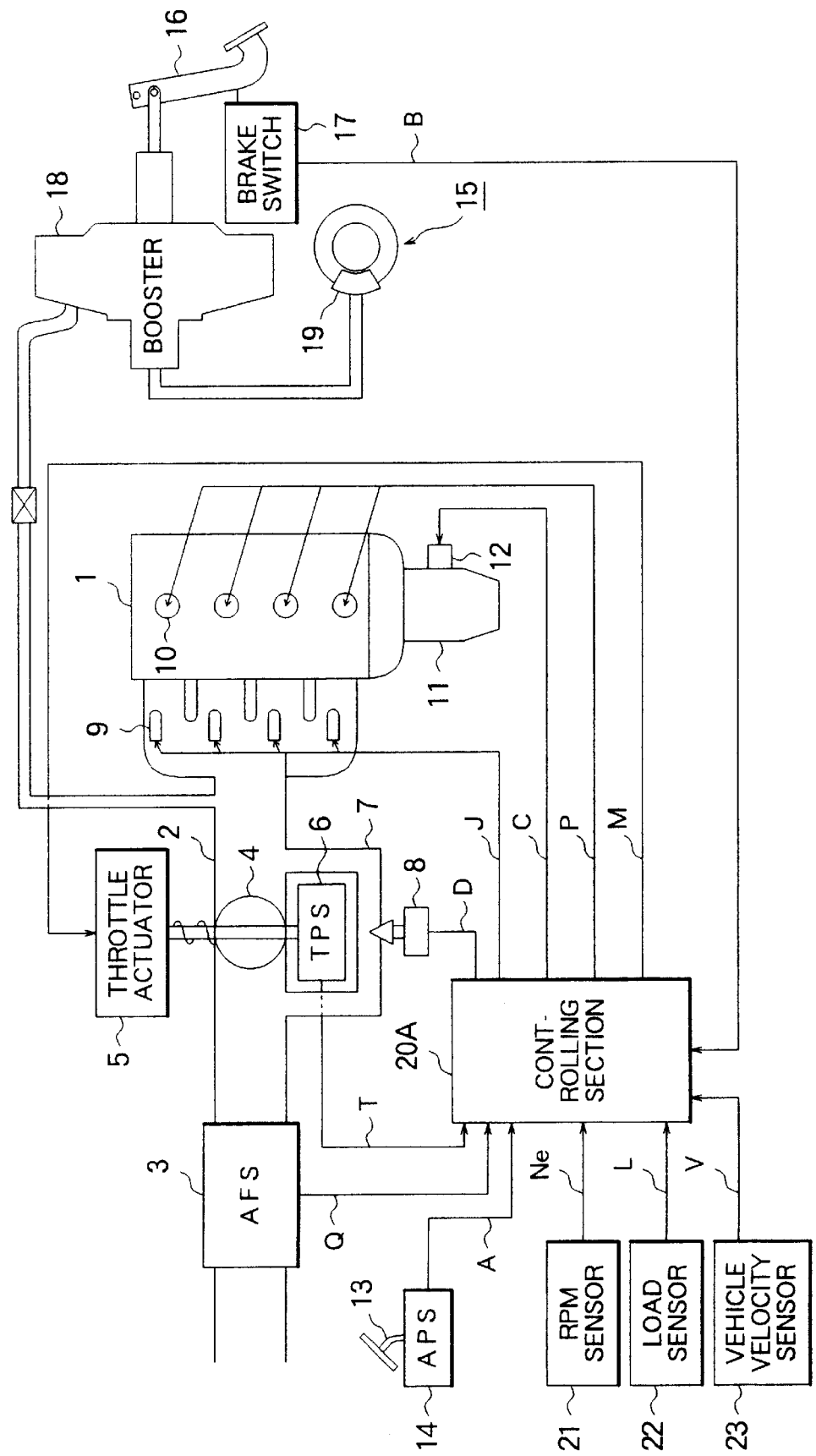
FIG. 6 is a view showing a structure of a general vehicle deceleration controlling apparatus for an automotive vehicle.

The operation of the embodiment 1 of the invention will now be described with reference to FIGS. 1 and 2 as well as FIG. 6.

FIG. 1 is a flowchart-showing an processing operation of the controlling section 20 in accordance with the embodiment 1 of the present invention.

Figure 2:
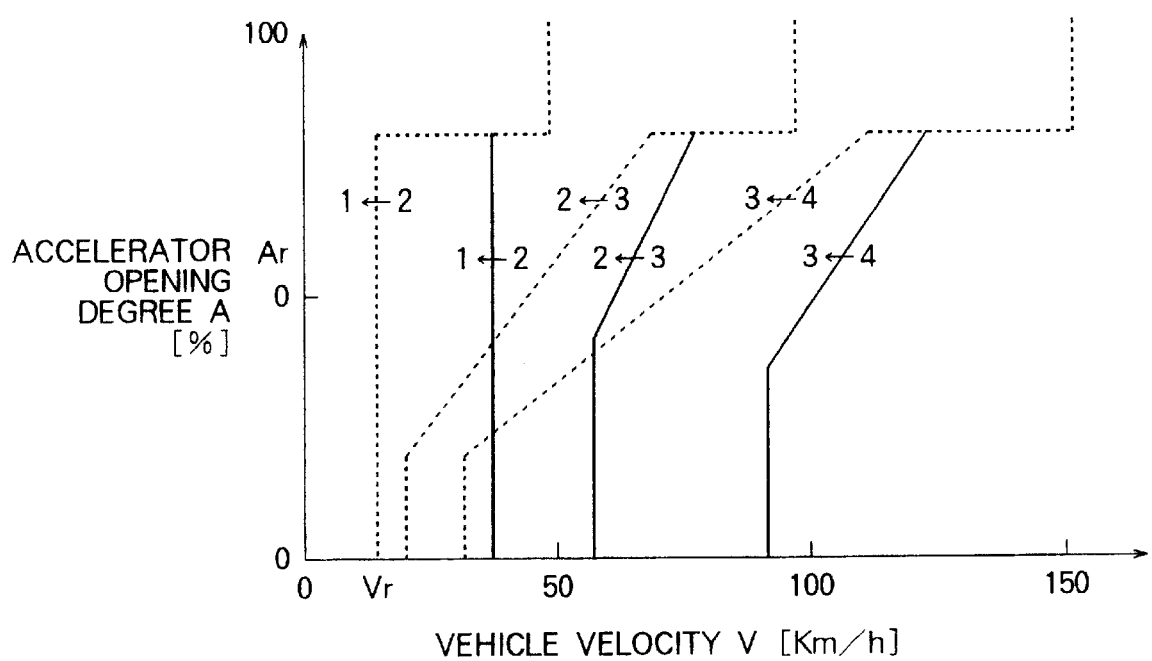
FIG. 2 is an illustration of a speed-change pattern to be changed in accordance with the first embodiment of the invention.

Also, FIG. 2 is an illustration showing a speed-change pattern of the automatic transmission 11. The abscissa axis and the ordinate axis thereof represent the vehicle velocity V [km/h] and the accelerator opening degree A [%], respectively.

In FIG. 2, the dotted line and the solid line represent the speed-change patterns of the normal speed change and the speed-change patterns in changing the speeds (in deceleration and in case of the breakdown of throttle-open) in accordance with the embodiment 1 of the invention.

In FIG. 1, referring first to the flag of the breakdown detecting means, the controlling section 20 determines whether or not any breakdown is present in the throttle valve 4 (step S1).

If it is determined that the throttle breakdown is not present (namely, "NO"), the control of the automatic transmission 11 is performed in accordance with the normal speed-change pattern (see the dotted line in FIG. 2) (step S2) to finish the processing routine shown in FIG. 1.

On the other hand, in step S1, if it is determined that the throttle breakdown is present (namely, "YES"), then the flag of the throttle-open breakdown detecting means is referred to, and it is determined whether or not the throttle valve 4 is out of order while being kept open (step S3).

If it is determined that the breakdown is not the breakdown of throttle-open (i.e., "NO"), the control of the automatic transmission 11 is performed in accordance with the normal speed-change pattern (not shown) changed to the normal mode in the normal breakdown determination (step S4) to finish the processing routine shown in FIG. 1.

On the other hand, in step S3, if it is determined that the breakdown of the throttle valve 4 is the breakdown of throttle-open (i.e., "YES"), then it is determined whether or not the vehicle is in the deceleration condition; that is, whether or not the brake signal B from the brake switch 17 is turned on (that is, the brake system 15 is operated) (step S5).

If it is determined that the operation is not in the deceleration and the brake signal B is not turned on (i.e., "NO"), the automatic transmission 11 is controlled in accordance with a speed-change pattern (not shown) normally changed in a normal breakdown of throttle-open determination (step S6). The process advances to the next step S8.

On the other hand, in step S5, if it is determined that the brake signal B is turned on (i.e., "YES"), the automatic transmission 11 is controlled in accordance with the speed-change pattern changed as indicated by the solid line in FIG. 2 (step S7).

Thus, if the deceleration condition (in which the brake signal B is turned on) is detected in the breakdown of throttle-open of the throttle valve 4, the speed-change pattern is changed as indicated by the solid line in FIG. 2. Accordingly, even if a relatively high vehicle velocity is attained, it is likely that the gear speed-change ratio is shifted to the lower gear side (first speed side). Accordingly, since the switch to the lower speed in the deceleration is quickly performed, the deceleration of the vehicle is facilitated by the engine brake function.

Subsequently, it is determined whether or not the speed changed on the basis of the speed-change pattern in the breakdown of throttle-open is the first speed (step S8). If this is not the first speed (i.e., "NO"), the processing routine in FIG. 1 is finished.

On the other hand, in step S8, it is determined that the speed is the first speed (i.e., "YES"), then, referring to the vehicle velocity signal V from the vehicle velocity sensor 23, it is determined whether or not the vehicle velocity V is equal to or less than a predetermined vehicle velocity Vr (a predetermined deceleration condition immediately before the vehicle stops) (step S9).

If it is determined that the velocity is lower than Vr (i.e., "NO"), the processing routine in FIG. 1 is finished intact.

On the other hand, in step S9, if it is determined that the velocity is equal to or higher than Vr (i.e., "YES"), since this is a predetermined deceleration condition (immediately before the vehicle stops), the speed is set at the second speed (step S10) to finish the processing routine of FIG. 1.

Thus, the speed is set at the second speed, the speed-change ratio is limited to the predetermined speed-change ratio so that the generated torque is reduced to facilitate the stop of the vehicle.

In general, immediately before the stop of the vehicle, if the speed is set in the predetermined range of the speed-change ratio (corresponding to a second speed), the vehicle can be stopped easily. The reason for this is that, as mentioned above, the drive torque is increased in the speed-change ratio equal to or more than the second speed (corresponding to the first speed), so that the drive torque is increased, and inversely, in the speed-change ratio equal to or less than the second speed (corresponding to the third speed), the idle running feeling occurs so that it is difficult to stop the vehicle.

Accordingly, even in the case where the work of the brake system 15 becomes worse by the breakdown of throttle-open of the throttle valve 4, it is possible to obtain the deceleration that suitable meets the will of the driver by changing the speed-change pattern as described above.

Also, in this case, the process is attained only by the processing operation of the controlling section 20. Accordingly, it is unnecessary to add another structural element, so as to suppress the increase of the cost therefor.

In FIG. 1, the predetermined deceleration condition immediately before the stop of the vehicle is detected by the vehicle velocity V that is equal to or less than the predetermined vehicle velocity Vr. However, this may be detected on the basis of the accelerator opening degree A which is equal to or less than a predetermined opening degree or the brake signal B, also may be detected by combining the vehicle velocity V, the accelerator opening degree A and the like.

Embodiment 2

Incidentally, in the embodiment 1, when the predetermined deceleration condition immediately before the stop of the vehicle is detected, the speed is set at the second speed. However, it is possible to set this at the third speed.

Embodiment 3

Also, in accordance with the steps S8 to S10 the change of the speed-change ratios is executed corresponding to the predetermined deceleration condition. However, when there is no particular problem even if the deceleration is effected to the speed-change ratio corresponding to the first speed, it is possible to continue the deceleration control up to the speed-change pattern indicated by the solid line of FIG. 2 without executing the steps S8 to S10.

Embodiment 4

Also, in the embodiment 1 described above, after it is detected that the speed change stage is in the first speed position in the steps S8 to S10, the predetermined deceleration condition is detected and the speed is changed and set at the second speed. However, it is possible to set, in advance, a region for prohibiting the speed from shifting to the first speed as the speed-change pattern.

Figure 3:
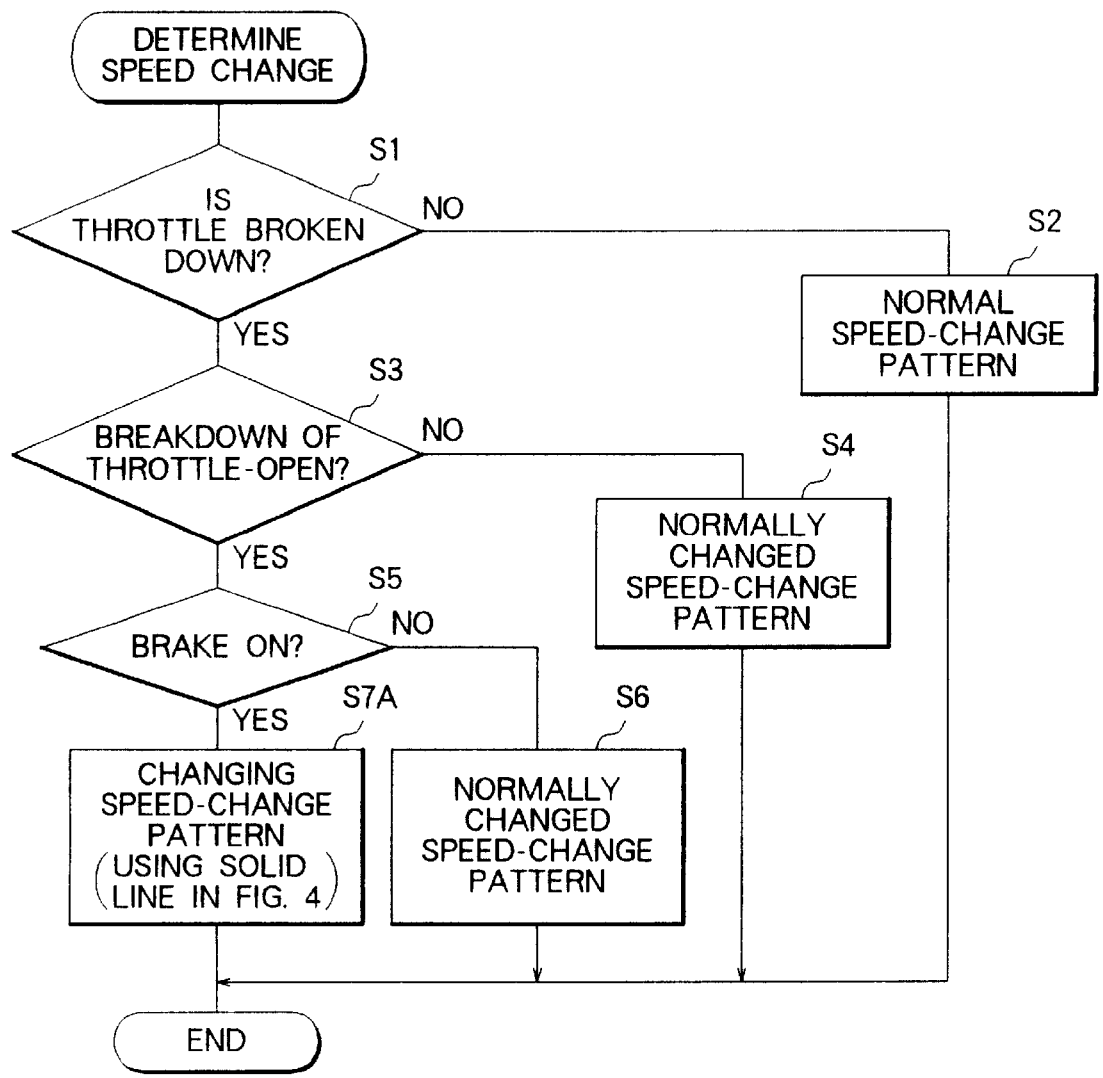
FIG. 3 is a flowchart showing a processing operation in accordance with a fourth embodiment of the present invention.

FIG. 3 is a flowchart showing a processing operation in accordance with the embodiment 4 of the present invention in which the prohibition region for prohibition of the shift to the first speed is set, and step S7A corresponds to the above-described step S7. In FIG. 3, the explanation as to the steps S1 to S6 as described in conjunction with the embodiment 1 will be omitted.

Figure 4:
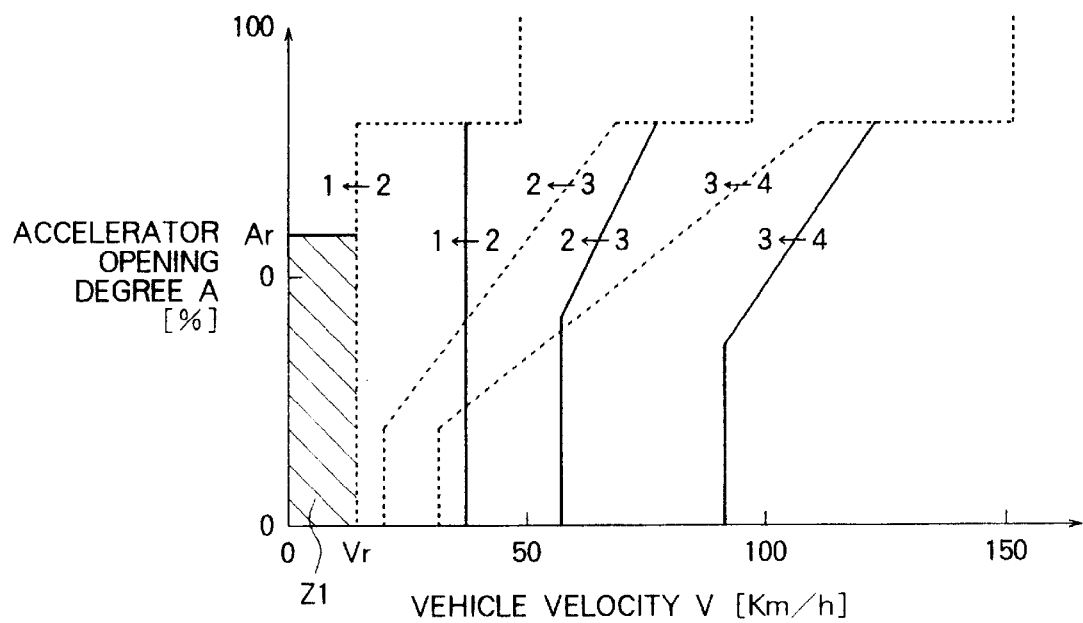
FIG. 4 is an illustration of a speed-change pattern to be changed in accordance with the fourth embodiment of the invention.

Also, FIG. 4 is an illustration showing a speed-change pattern used in the step S7A in FIG. 3. The dotted line and the solid line represent the speed-change patterns of the normal speed change, and the speed-change patterns which occur in the breakdown of throttle-open generation and which are changed in the deceleration, respectively.

In FIG. 4, the first speed prohibition region Z1 (indicated by the hatched portion) is set in a range corresponding to the predetermined deceleration operational region just before the stop of the vehicle (where the accelerator opening degree A is equal to less than the predetermined opening degree Ar and the vehicle velocity V is equal to or less than the predetermined vehicle velocity Vr).

In this case, when the speed-change pattern changing means changes the speed-change pattern as indicated by the solid line in FIG. 4 (step S7A), when the breakdown of throttle-open of the throttle valve 4 ("YES" in step S3) and the deceleration condition ("YES" in step S5) are detected.

At this time, in the first speed prohibition region Z1 (A≦Ar, and V≦Vr), since there is no chance that the speed change stage is set at the position corresponding to the first speed, there is no problem in stopping the vehicle. Accordingly, at the same time when the step S7A has been executed, the processing routine shown in FIG. 4 is finished.

Thus, the control is effected to the optimum speed-change ratio (corresponding to the second speed in this case) when the vehicle is decelerated (at low vehicle velocity), so that the stopping of the vehicle is easy and the problem in the abrupt start and the like may be prevented.

Embodiment 5

Incidentally, in the embodiments 1 to 4 as described above, it is detected that the speed is set at a level equal to or less than the predetermined change speed in the deceleration condition detection just before the stop of the vehicle, in addition to the change of the speed-change patterns for the automatic transmission 11. However, it is possible to enhance the deceleration effect only by setting the speed to the level equal to or less than the predetermined change speed.

Embodiment 6

Incidentally, in the embodiments 1 to 4 as described above, as shown in FIG. 6, the description is made as to the case where a hydraulic pressure adjusting means for brake system 15 is not provided. However, the deceleration controlling apparatus for an automotive vehicle may be provided with hydraulic pressure adjusting means 24 and 25.

Figure 5:
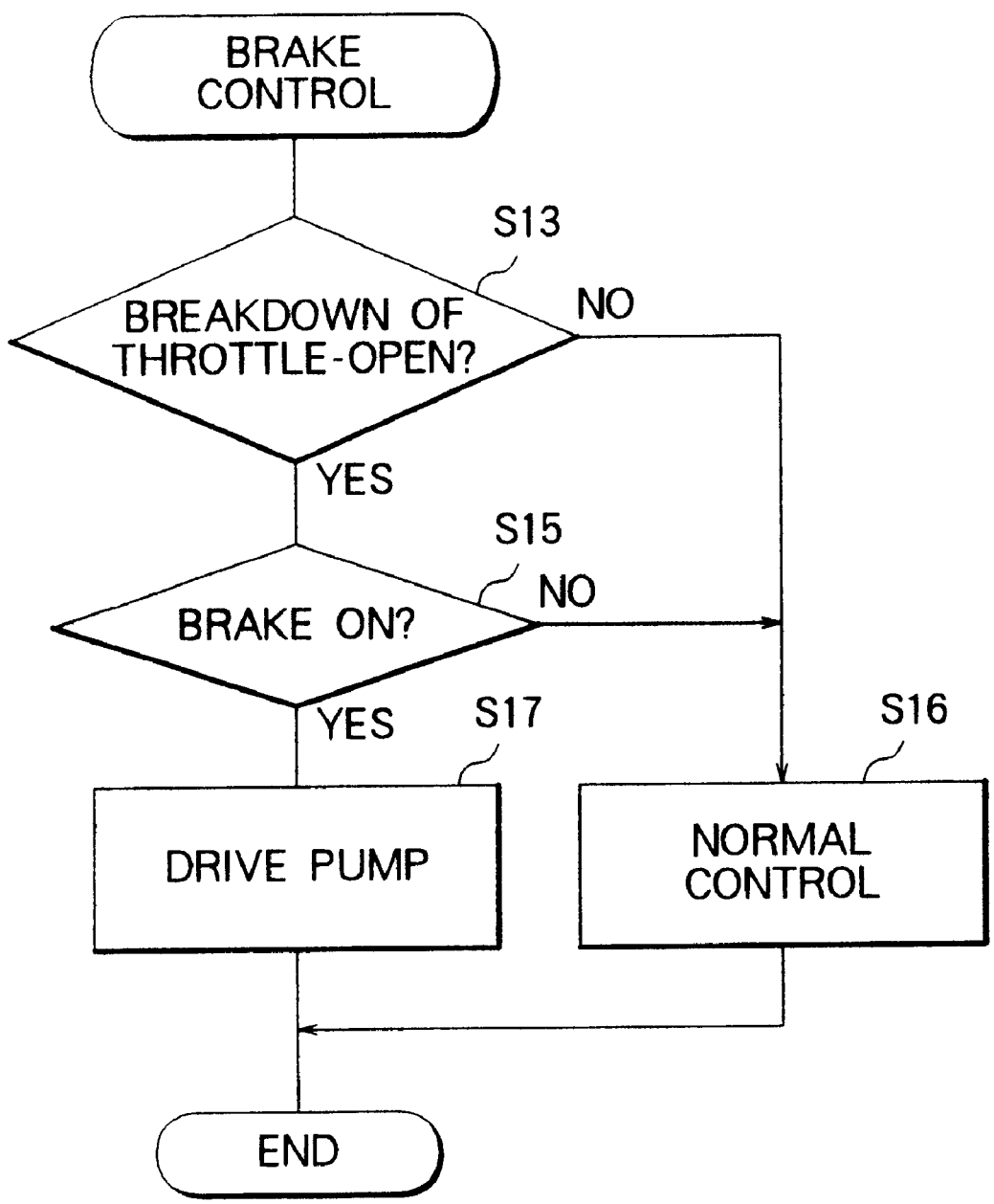
FIG. 5 is a flowchart showing a brake processing operation in accordance with a sixth embodiment of the present invention.

FIG. 5 is a flowchart showing a brake processing operation in accordance with the embodiment 6 of the invention provided with a hydraulic pressure adjusting means, in which the steps S13 and S15 correspond to the steps S3 and S5, respectively.

Figure 7:
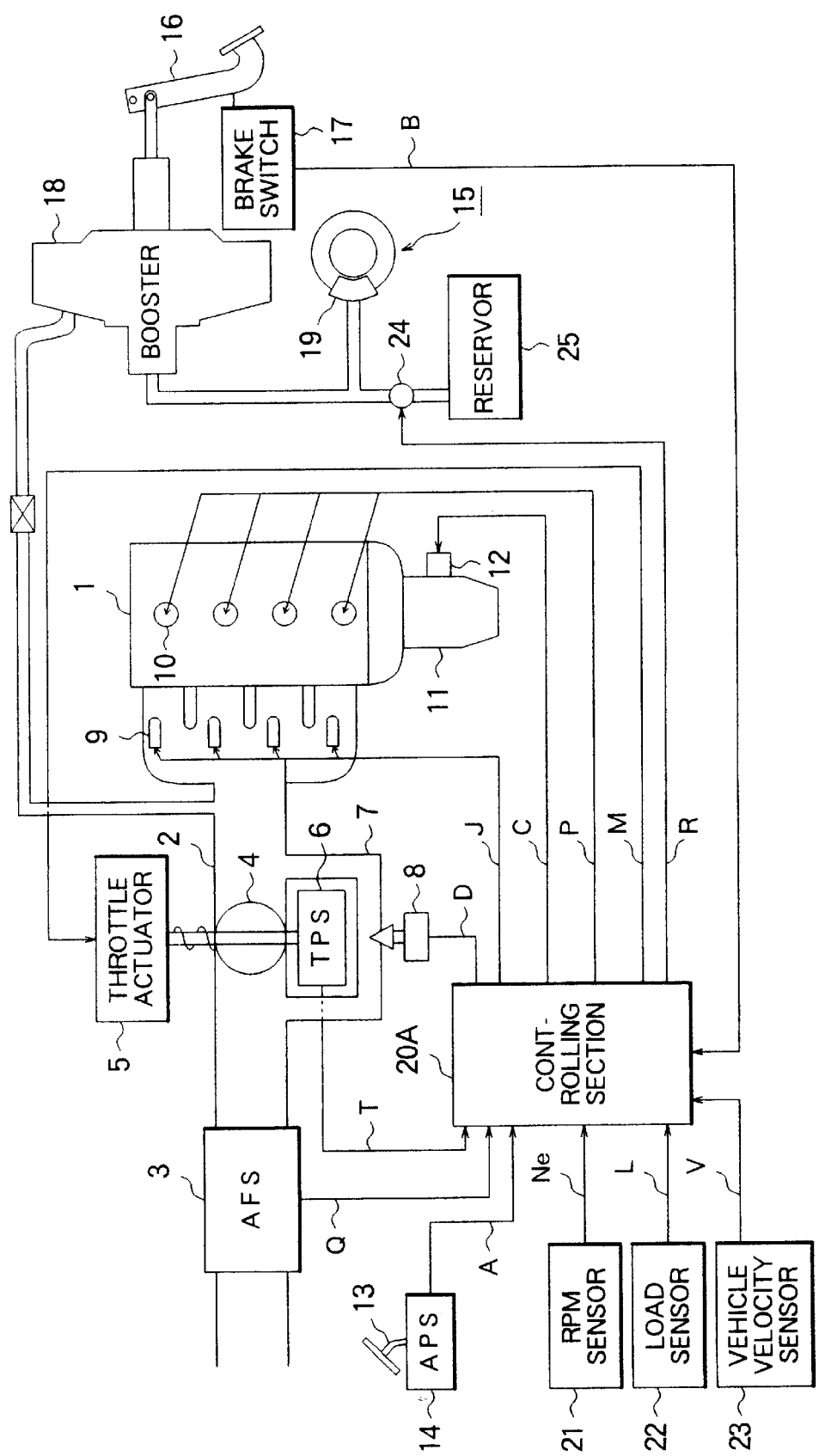
FIG. 7 is a view showing a structure of a general vehicle deceleration controlling apparatus for an automotive vehicle having a general hydraulic pressure adjusting means.

Incidentally, the structure of the embodiment 6 of this invention is shown in FIG. 7, and there is only a difference therebetween in a part of the operational program within the controlling section 20A.

In this case, in order to enhance the stability of the vehicle in the brake system 15 (see FIG. 7), there is provided a hydraulic pressure adjusting means for mechanically controlling the hydraulic pressure, i.e., the system including a pump 24 and a reservoir 25.

Also, the controlling section 20A includes a hydraulic pressure controlling means for controlling the pump 24 in response to the deceleration condition.

In FIG. 5, the controlling section 20A determines whether or not the throttle valve 4 is broken down while being kept opened, referring to the flag of the throttle-open breakdown detecting means (step S13).

If it is determined that the breakdown is not the breakdown of throttle-open (namely, "NO"), the normal brake control is effected (step S16) to finish the processing routine of FIG. 5.

On the other hand, in step S13, if it is determined that the throttle valve 4 is broken down while being kept opened (i.e., "YES"), it is determined whether or not the vehicle is in the deceleration condition; that is, the brake signal B is turned on (step S15).

If it is determined that the vehicle is out of the deceleration condition and the brake signal B is turned off (i.e., "NO"), the above-described normal brake control (step S16) is executed. If it is determined that the brake signal B is turned on (namely, "YES"), the pump 24 is driven to thereby increase the brake force of the brake working portion 19 (step S17).

Thus, if the deceleration condition (brake signal B is turned on) is detected when the throttle valve 4 is broken down while being kept opened, the hydraulic pressure for driving the brake system 15 is increased to improve the brake effect. It is therefore easy to decelerate the vehicle.

Also, in this case, it is unnecessary to add a new structural element to the conventional apparatus (see FIG. 7). Accordingly, it is possible to suppress the increase of the cost therefor.

Also, since the brake force is mechanically increased through the pump 24, it is unnecessary to change the speed-change pattern for the automatic transmission 11.

Furthermore, it is possible to apply the invention to not only the vehicle having the automatic transmission but also the vehicle having the manual transmission.

Embodiment 7

Incidentally, in the embodiment 6, the deceleration effect is enhanced only by the hydraulic adjustment to the brake system 15. It is however possible to enhance the acceleration effect by using the change of the speed-change pattern to the automatic transmission 11.

Also, in the foregoing embodiments, the explanation is made as to the four speed automatic transmission 11 but as a matter of course, it is possible to apply the invention to the five or more speed multiple transmission or a continuous speed change transmission.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A deceleration controlling apparatus for an automotive vehicle, comprising:
    an engine, an accelerator pedal and a brake system which are mounted on the vehicle;
    an automatic transmission connected to said engine;
    a throttle valve for adjusting an amount of intake air of said engine;
    an accelerator opening degree sensor for detecting an opening degree of said accelerator pedal to output an accelerator opening degree signal;
    a throttle valve controlling means for electrically controlling an opening degree of said throttle valve in response to said accelerator opening degree signal;
    a throttle opening degree sensor for detecting an opening degree of said throttle valve to output a throttle opening degree signal;
    a throttle-open breakdown detecting means for detecting a breakdown of throttle-open of said throttle valve;
    a deceleration condition detecting means for detecting a deceleration condition of said vehicle; and
    a speed-change pattern changing means for changing a speed-change pattern of said automatic transmission on a low gear side when said breakdown of throttle-open and said deceleration condition are detected.

2. A deceleration controlling apparatus for an automotive vehicle as claimed in claim 1, wherein said throttle-open breakdown detecting means detects said breakdown of throttle-open on the basis of a relationship between said throttle opening degree signal and said accelerator opening degree signal.

3. A deceleration controlling apparatus for an automotive vehicle as claimed in claim 1, wherein said deceleration condition detecting means detects said deceleration condition when a brake pedal of said brake system is stepped in.

4. A deceleration controlling apparatus for an automotive vehicle as claimed in claim 1, wherein said speed-change pattern changing means sets a speed-change ratio of said automatic transmission to a level equal to or lower than a predetermined speed-change ratio.

5. A deceleration controlling apparatus for an automotive vehicle as claimed in claim 4, wherein said predetermined speed-change ratio corresponds to a second speed which is higher than a first speed on the lowest gear side.

6. A deceleration controlling apparatus for an automotive vehicle as claimed in claim 4, wherein said speed-change pattern changing means sets the speed-change ratio of said automatic transmission to a level equal to or lower than a predetermined speed-change ratio in the case where said deceleration condition detecting means detects a predetermined deceleration condition at a time immediately before a stop of said vehicle.

7. A deceleration controlling apparatus for an automotive vehicle as claimed in claim 6, wherein said predetermined deceleration condition is detected in the case where a velocity of said vehicle exhibits a level equal to or lower than a predetermined vehicle velocity.

8. A deceleration controlling apparatus for an automotive vehicle as claimed in claim 6, wherein said predetermined deceleration condition is detected in the case where a brake pedal of said brake system is stepped in.

9. A deceleration controlling apparatus for an automotive vehicle as claimed in claim 6, wherein said predetermined deceleration condition is detected in the case where said accelerator opening degree signal exhibits a level equal to or lower than a predetermined opening degree.

10. A deceleration controlling apparatus for an automotive vehicle as claimed in claim 6, wherein said speed-change pattern changing means sets a prohibition region where the speed is prohibited from shifting to a speed-change pattern within a region where said accelerator opening degree signal exhibits a level equal to or lower than a predetermined velocity.

11. A deceleration controlling apparatus for an automotive vehicle as claimed in claim 1, further comprising:
    a hydraulic pressure adjusting means for adjusting a hydraulic pressure for driving said brake system; and
    a hydraulic pressure adjusting means;
    wherein said hydraulic pressure in response to a step-in operation of said brake pedal in the case where said breakdown of throttle-open is detected.

12. A deceleration controlling apparatus for an automotive vehicle, comprising:
    an engine, an accelerator pedal and a brake system which are mounted on the vehicle;
    an automatic transmission connected to said engine;
    a throttle valve for adjusting an amount of intake air of said engine;
    an accelerator opening degree sensor for detecting an opening degree of said accelerator pedal to output an accelerator opening degree signal;
    a throttle valve controlling means for electrically controlling an opening degree of said throttle valve in response to said accelerator opening degree signal;
    a throttle opening degree sensor for detecting an opening degree of said throttle valve to output a throttle opening degree signal;
    a throttle-open breakdown detecting means for detecting a breakdown of throttle-open of said throttle valve;
    a deceleration condition detecting means for detecting a deceleration condition of said vehicle; and
    a speed-change pattern changing means for setting a speed-change ratio of said automatic transmission at a level equal to or lower than a predetermined speed-change ratio when said breakdown of throttle-open and said deceleration condition are detected.

13. A deceleration controlling apparatus for an automotive vehicle as claimed in claim 12, wherein said speed-change pattern changing means sets the speed-change ration of said automatic transmission to the level equal to or lower than the speed-change pattern in the case where said deceleration condition detecting means detects a predetermined deceleration condition at a time immediately before a stop of said vehicle, and said predetermined speed-change ratio corresponds to a second speed which is higher than a first speed on the lowest gear side.

14. A deceleration controlling apparatus for an automotive vehicle, comprising:
    an engine, an accelerator pedal and a brake system which are mounted on the vehicle;
    a hydraulic pressure adjusting means for adjusting a hydraulic pressure for driving said brake system;
    a hydraulic pressure controlling means for controlling said hydraulic pressure adjusting means;
    a throttle valve for adjusting an amount of intake air of said engine;

an accelerator opening degree sensor for detecting an opening degree of said accelerator pedal to output an accelerator opening degree signal;

a throttle opening degree sensor for detecting an opening degree of said throttle valve to output a throttle opening degree signal;

a throttle-open breakdown detecting means for detecting a breakdown of throttle-open of said throttle valve; and a deceleration condition detecting means for detecting a deceleration condition of said vehicle;

wherein said hydraulic pressure controlling means increases said hydraulic pressure in the case where said breakdown of throttle-open and said deceleration condition are detected.

* * * * *